US008780582B2

(12) United States Patent
Liu

(10) Patent No.: US 8,780,582 B2
(45) Date of Patent: Jul. 15, 2014

(54) ELECTRONIC DEVICE

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/192,728

(22) Filed: Jul. 28, 2011

(65) Prior Publication Data

US 2012/0162950 A1    Jun. 28, 2012

(30) Foreign Application Priority Data

Dec. 28, 2010  (CN) .......................... 2010 1 0608989

(51) Int. Cl.
*H05K 7/02* (2006.01)
*H05K 7/04* (2006.01)
*G02F 1/1333* (2006.01)

(52) U.S. Cl.
USPC ................. 361/807; 349/56; 349/58; 349/59; 349/60

(58) Field of Classification Search
USPC .......... 361/807, 600, 679.01, 679.02, 679.03, 361/679.04, 679.21, 679.26, 679.27, 679.3, 361/679.55, 679.56; 349/56, 58, 59, 60; 345/204, 205, 206, 1.1, 1.3
See application file for complete search history.

(56) References Cited

U.S. PATENT DOCUMENTS

| | | | |
|---|---|---|---|
| 6,593,979 B1 * | 7/2003 | Ha et al. ........................... | 349/58 |
| 6,816,384 B2 * | 11/2004 | Wu et al. ........................ | 361/759 |
| 7,633,747 B2 * | 12/2009 | Yang et al. .................. | 361/679.3 |
| 7,697,281 B2 * | 4/2010 | Dabov et al. ............. | 361/679.55 |
| 8,059,399 B2 * | 11/2011 | Huang ....................... | 361/679.59 |
| 2010/0046193 A1 * | 2/2010 | Choi ............................ | 361/818 |
| 2010/0085689 A1 * | 4/2010 | Furumatsu et al. ....... | 361/679.01 |
| 2010/0090569 A1 * | 4/2010 | Huang ........................ | 312/223.1 |
| 2011/0242745 A1 * | 10/2011 | Kono ....................... | 361/679.01 |
| 2011/0274514 A1 * | 11/2011 | Lee ............................... | 411/368 |

* cited by examiner

*Primary Examiner* — Jenny L Wagner
*Assistant Examiner* — Ahmad D Barnes
(74) *Attorney, Agent, or Firm* — Novak Druce Connolly Bove + Quigg LLP

(57) ABSTRACT

An electronic device includes a housing, a plurality of bolts, a plurality of support members and a display screen. The housing is curved. The plurality of bolts are separately fixed to the bottom plate and received within the housing. The plurality of support members are assembled to the top ends of the plurality of bolts and are individually adjustable as to the height of their fixing location, so that all of the support members can be adjusted to be positioned on the same horizontal plane. The display screen is assembled within the housing, and supported by the plurality of support members.

14 Claims, 4 Drawing Sheets

ELECTRONIC DEVICE

BACKGROUND

1. Technical Field

This disclosure relates to electronic devices, and particularly to an electronic device equipped with an adjustable support mechanism.

2. Description of Related Art

A commonly used electronic device, such as a liquid crystal display, generally includes a housing, and a display screen assembled within the housing. The housing includes a bottom plate, a peripheral wall(s) extending from the bottom plate, and a plurality of bolts fixed to the bottom plate for supporting the display screen.

However, when the bottom plate of the electronic device is a curved structure, the plurality of bolts fixed to the bottom plate are then not located at a same height, so that the top ends of the bolts are not on the same horizontal plane, such that, the assembled display screen supported by the plurality of bolts is thereby not level, creating viewing anomalies and a poor aesthetic effect.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
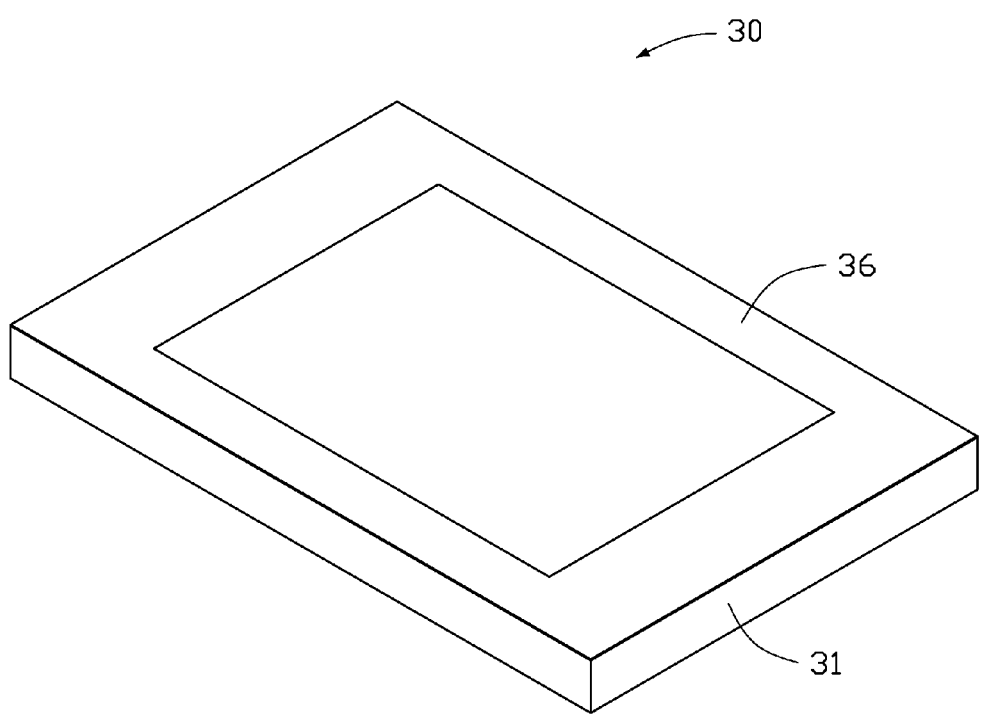
FIG. 1 is an isometric view of an embodiment of an electronic device as assembled.
Figure 2:
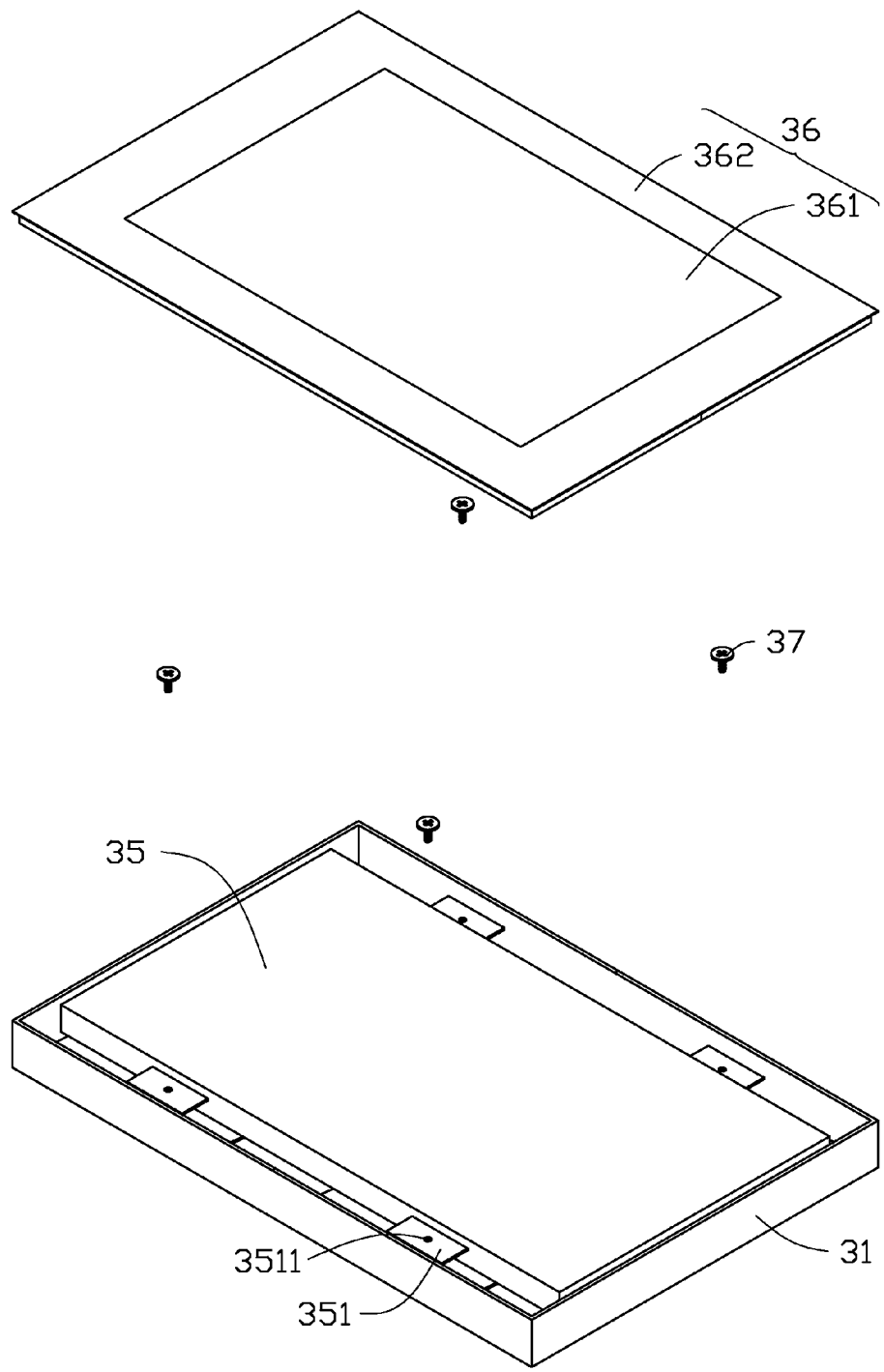
FIG. 2 is an exploded, isometric view of the electronic device of FIG. 1.
Figure 3:
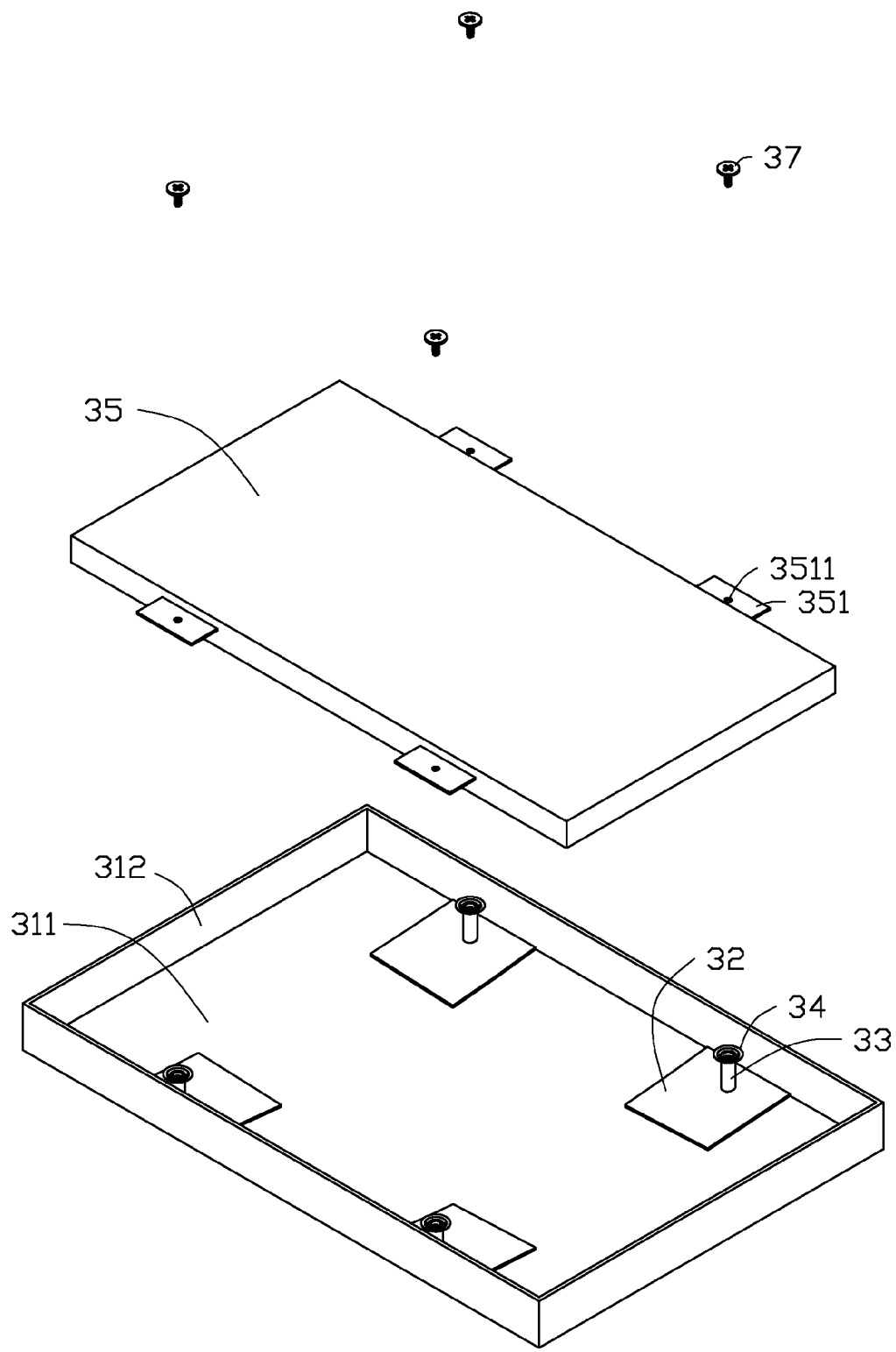
FIG. 3 is a partially exploded, isometric view of the electronic device similar to FIG. 2, wherein, a transparent protective cover thereof is omitted.
Figure 4:
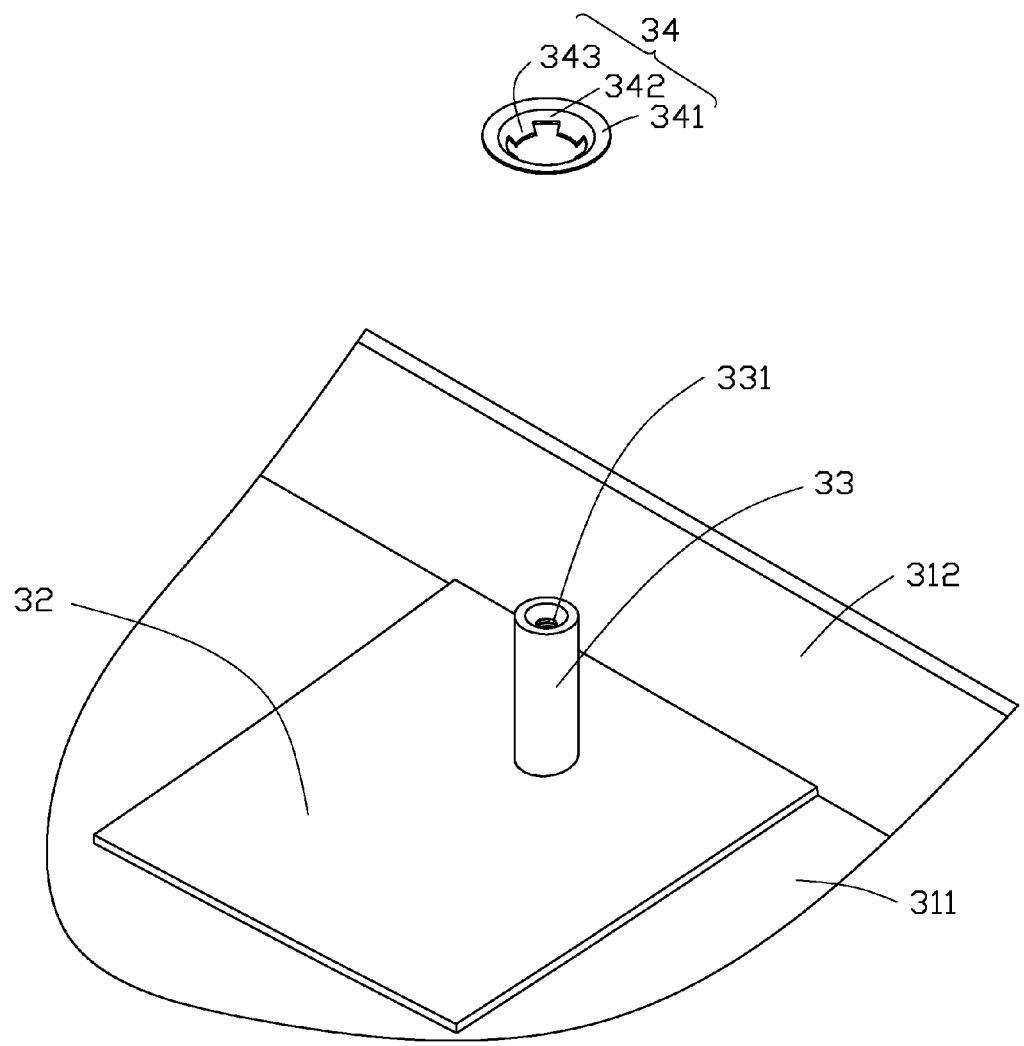
FIG. 4 is a magnified view of the housing and a support member of the electronic device shown in FIG. 3.

Referring to FIGS. 1 through 4, an embodiment of an electronic device 30 is shown. The electronic device 30 may be a liquid crystal display, a touch panel computer, a mobile phone, a digital album, or a personal digital assistant (PDA), etc. In the illustrated embodiment, the electronic device 30 is a touch panel computer, and includes a housing 31, a plurality of cushion plates 32, a plurality of bolts 33, a plurality of support members 34, a display screen 35, a protective plate 36, and a plurality of fasteners 37. The plurality of cushion plates 32 together with the plurality of bolts 33 are positioned within the housing 31. Each support member 34 is adjustably assembled to the distal end of one bolt 33. The display screen 35 is securely assembled within the housing 31 by the plurality of fasteners 37, and supported by the plurality of support members 34. The protective plate 36 covers the display screen 35 and is clipped or latched to the housing 31. The electronic device 30 may also include other components, such as a circuit board, a plurality of electronic components, etc., which are not detailed here.

The housing 31 includes a bottom plate 311 and a peripheral side wall 312 extending from the edge of the bottom plate 311. Viewed from the outside, the bottom plate 311 is a curved plate, having a curved bottom surface underneath the peripheral side wall 312. In the illustrated embodiment, the housing 31 is substantially rectangular, made of aluminum and formed by stretch forming technology.

The plurality of cushion plates 32 are separately mounted on the bottom plate 311 of the housing 31. The plurality of bolts 33 are respectively fixed to the plurality of cushion plates 32, for supporting the display screen 35. Each bolt 33 defines a screw hole 331 at the distal end thereof. In the illustrated embodiment, there are four cushion plates 32 and four bolts 33. The four cushion plates 32 are symmetrically mounted on the bottom plate 311, and positioned so as to provide effective and durable support for the display screen 35. Each of the four bolts 33 is fixed to one of the four cushion plates 32. In one embodiment, the bolt 33 and the corresponding cushion plate 32 are integrally formed.

Each of the bolts 33, supports a support member 34. There are four support members 34 in the illustrated embodiment. Each support member 34 is substantially hemispherical shaped, and includes a circular support ring 341, and a substantially hollow conical clamping portion 342 extending from an inner circular edge of the support ring 341. A diameter of the hollow conical clamping portion 342 is decreased along a direction away from the support ring 341. A plurality of elastic clamping arms 343 extend from a distal end of the clamping portion 342 away from the support ring 341, separately along a circular direction of the clamping portion 342. A diameter of the distal end of the clamping portion 342 is slightly less than or substantially the same as the outer diameter of the bolt 33, such that, when the support member 34 is sleeved on the bolt 33, the elastic clamping arms 343 grip the top end of the bolt 33. The support member 34 is manually adjustable upwardly along an axis of the bolt 33, and downwardly adjustable by a fixture (not shown) to spread the elastic clamping arms 343. In one embodiment, the clamping portion 342 and the elastic clamping arms 343 may be replaced by a hollow conical elastic member.

The display screen 35 is assembled within the housing 31, and securely fixed to the top end of the plurality of bolts 33 by the plurality of fasteners 37. The display screen 35 includes a plurality of positioning members 351 extending from the surrounding regions of the display screen 35, corresponding to the plurality of the bolts 33. Each positioning member 351 defines a positioning hole 3511 therein. In the illustrated embodiment, the display screen 35 is substantially rectangular, and includes four positioning members 351 symmetrically extending from opposite sides of the display screen 35.

The protective plate 36 covers the display screen 35 for the protection of the display screen 35. The protective plate 36 includes a display area 361 formed at a central portion thereof, and a shade area 362 formed at a periphery thereof to surround the display area 361. In the illustrated embodiment, the protective plate 36 is substantially rectangular and made of transparent material.

There are four fasteners 37 in the illustrated embodiment, and the fasteners 37 are a plurality of flathead screws configured for securing the display screen 35 to the top end of the bolts 33.

When assembling the electronic device 30, the cushion plates 32 together with the bolts 33 are firstly soldered or otherwise attached to the bottom plate 311 of the housing 31. The support members 34 are aligned with and sleeved on the top ends of the bolts 33. The support members 34 are adjusted to make all of the support rings 341 of the support members 34 level, namely, the distal ends of the support members 34 are positioned on one horizontal plane. The elastic clamping arms 343 of the support member 34 are firmly crimped or latched to the top end of the bolt 33. The display screen 35 is assembled within the housing 31. The positioning members 351 of the display screen 35 are aligned with and supported by the support members 34. The fasteners 37 are passed through the positioning holes 3511 of the positioning members 351 of the display screen 35 and finally screwed into the corresponding screw holes 331 of the bolts 33. Finally, the protective plate 36 is installed over the display screen 35 to finish the assembly of the electronic device 30.

The electronic device 30 has a simple structure providing a flat and level display screen and optimal viewing, by means of the adjustable support members 34 assembled to the top ends of the bolts 33.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the embodiment to the full extent indicated by the broad general meaning of the terms in which the appended claims are expressed.

What is claimed is:

1. An electronic device, comprising: a housing; a plurality of bolts separately positioned within the housing; a plurality of support members adjustably assembled to top ends of the plurality of bolts, away from the housing, and the plurality of support members being adjustable upwardly or downwardly along an axis of the bolt, thereby being located at a predetermined plane; a plurality of fasteners; and a display screen assembled within the housing by the plurality of fasteners fixed to the top ends of the plurality of bolts, supported by the plurality of support members, and being positioned on the predetermined plane; wherein each support member is substantially hemispherical shaped, and comprises a circular support ring, and a substantially hollow conical clamping portion extending from an inner circular edge of the support ring; the clamping portion of the support member is sleeved on and adjustably latched to the top end of the bolt.

2. The electronic device as claimed in claim 1, wherein a diameter of the hollow conical clamping portion is decreased along a direction away from the support ring.

3. The electronic device as claimed in claim 1, wherein each support member further comprises a plurality of elastic clamping arms extending from the clamping portion separately, along a circular direction of the clamping portion, and latching with the top end of the bolt.

4. The electronic device as claimed in claim 1, wherein a diameter of the distal end of the clamping portion is slightly less than or substantially the same as the outer diameter of the bolt.

5. The electronic device as claimed in claim 1, wherein each bolt defines a screw hole at the top end thereof; the display screen further comprises a plurality of positioning members extending from a surrounding region thereof, corresponding to the plurality of the bolts; each positioning member defines a positioning hole; each of the plurality of fasteners passes through each of the positioning holes of the positioning members of the display screen and is screwed into each of the screw holes of the bolts, respectively.

6. The electronic device as claimed in claim 1, wherein the housing comprises a bottom plate and a peripheral side wall extending from a peripheral edge of the bottom plate, the electronic device further comprises a plurality of cushion plates separately mounted on the bottom plate of the housing; the plurality of bolts are respectively fixed to the plurality of cushion plates, for supporting the display screen.

7. The electronic device as claimed in claim 6, wherein the electronic device further comprises a protective plate, and the protective plate is covered on the display screen for protecting the display screen.

8. The electronic device as claimed in claim 7, wherein the protective plate comprises a display area formed at a central portion thereof, and a shade area formed at a periphery thereof to surround the display area.

9. An electronic device, comprising:
a housing having a curved bottom plate and a peripheral side wall extending from a peripheral edge of the bottom plate; a plurality of bolts separately fixed to the bottom plate and received within the housing; a plurality of support members adjustably assembled to top ends of the plurality of bolts, away from the housing, respectively; the plurality of support members being adjustable upwardly or downwardly along an axis of the bolt, thereby being located at a same horizontal plane; a plurality of fasteners; and a display screen assembled within the housing by the plurality of fasteners fixed to the top ends of the plurality of bolts, and supported by the plurality of support members, and being positioned on the same horizontal plane; wherein each support member is substantially hemispherical shaped, and comprises a support ring, and a clamping portion extending from an inner circular edge of the support ring; the clamping portion of the support member is sleeved on and adjustably latched to the top end of the bolt.

10. The electronic device as claimed in claim 9, wherein the display screen further comprises a plurality of positioning members extending from the surrounding regions thereof; the plurality of positioning members are fixed to the top ends of the plurality of the bolts, respectively.

11. The electronic device as claimed in claim 10, wherein each positioning member defines a positioning hole, each of the bolts defines a screw hole at the top end thereof; each of the plurality of fasteners passes through each of the positioning holes of the positioning members of the display screen and is screwed to the top end of each of the bolts, respectively.

12. The electronic device as claimed in claim 10, wherein a diameter of the hollow conical clamping portion is decreased along a direction away from the support ring.

13. The electronic device as claimed in claim 10, wherein each support member further comprises a plurality of elastic clamping arms extending from the clamping portion separately, along a circular direction of the clamping portion, and latching with the top end of the bolt.

14. The electronic device as claimed in claim 13, wherein the electronic device further comprises a protective plate covered on the display screen for protecting the display screen.

* * * * *